(12) United States Patent
Xie

(10) Patent No.: US 11,995,415 B2
(45) Date of Patent: May 28, 2024

(54) MACHINE TRANSLATION METHOD AND APPARATUS WITH JOINT OPTIMIZATION OF TRANSLATION MODEL AND PARTITIONING MODEL, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Jun Xie, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 359 days.

(21) Appl. No.: 17/403,857

(22) Filed: Aug. 16, 2021

(65) Prior Publication Data
US 2021/0374363 A1    Dec. 2, 2021

Related U.S. Application Data

(63) Continuation of application No. PCT/CN2020/096074, filed on Jun. 15, 2020.

(30) Foreign Application Priority Data

Jul. 8, 2019 (CN) .......................... 201910611919.7

(51) Int. Cl.
*G06F 40/58* (2020.01)

(52) U.S. Cl.
CPC .................... *G06F 40/58* (2020.01)

(58) Field of Classification Search
CPC ..................................................... G06F 40/58
See application file for complete search history.

(56) References Cited

U.S. PATENT DOCUMENTS

2014/0019113 A1* 1/2014 Wu .................. G06F 40/242
704/2
2017/0031899 A1 2/2017 Lee et al.
(Continued)

FOREIGN PATENT DOCUMENTS

| CN | 105912533 A | 8/2016 | |
| CN | 107632981 A * | 1/2018 | ............. G06F 17/28 |

(Continued)

OTHER PUBLICATIONS

Pouget-Abadie, Jean, et al. "Overcoming the curse of sentence length for neural machine translation using automatic segmentation." arXiv preprint arXiv:1409.1257 (2014). (Year: 2014).*

(Continued)

*Primary Examiner* — Jialong He
(74) *Attorney, Agent, or Firm* — ANOVA LAW GROUP, PLLC

(57) ABSTRACT

A machine translation method includes: receiving a sentence, the sentence including a plurality of words; calling a machine translation model obtained through training, the machine translation model including a partitioning model and a translation model; partitioning the sentence based on the partitioning model and according to word vectors of the words, to obtain to-be-translated blocks, each to-be-translated block including at least one of the words; and translating the sentence based on the translation model and the to-be-translated blocks, to obtain a translation result.

17 Claims, 13 Drawing Sheets

(56) References Cited

U.S. PATENT DOCUMENTS

2019/0384822 A1* 12/2019 Tu .......................... G06N 3/08
2020/0159822 A1* 5/2020 Roh ...................... G10L 13/00
2022/0156461 A1* 5/2022 Li ........................ G06F 40/58

FOREIGN PATENT DOCUMENTS

| CN | 107632981 | A | 1/2018 | |
| CN | 108304388 | * | 7/2018 | ............ G06F 40/58 |
| CN | 110334360 | A | 10/2019 | |

OTHER PUBLICATIONS

The World Intellectual Property Organization (WIPO) International Search Report for PCT/CN2020/096074 dated Sep. 18, 2020 6 Pages (including translation).

The State Intellectual Property Office of the People's Republic of China (SIPO) Office Action 1 for for 201910611919.7 dated May 29, 2020 12 Pages (including translation).

Juan Zhang et al., "Shape Modeling Method Based on Deep Learning," Chinese Journal of Computers, vol. 41. No. 1., Jan. 31, 2018 (Jan. 31, 2018), pp. 136-137. 13 pages.

Jinsong Su et al., "A Hierarchy-to-Sequence Attentional Neural Machine Translation Mode," IEEE/ACM Transactions on Audio, Speech and Language Processing, vol. 26, No. 3, Mar. 2018, pp. 623-632. 10 pages.

* cited by examiner

| Parallel sentence pair | |
|---|---|
| Source sentence | 一旦有险情，能召之即来、来之能战。 |
| Target sentence | Once an emergency occurs , people can come and fight immediately . |

| | Chinese | English | |
|---|---|---|---|
| Clause | 一旦有险情， | Once there is a danger, | |
| Clause | 能召之即来、 | can call, | |
| Clause | 来之能战。 | can fight. | |
| | | | |

FIG. 16

|  | Chinese | English |  |
|---|---|---|---|
| To-be-translated block | 一旦 | Once |  |
| To-be-translated block | 有险情 | an emergency occurs |  |
| To-be-translated block | , | , |  |
| To-be-translated block | 能召之即来、来之能战 | people can come and fight immediately |  |
| To-be-translated block | 。 | . |  |
|  |  |  |  |

FIG. 17

MACHINE TRANSLATION METHOD AND APPARATUS WITH JOINT OPTIMIZATION OF TRANSLATION MODEL AND PARTITIONING MODEL, ELECTRONIC DEVICE, AND STORAGE MEDIUM

CROSS-REFERENCES TO RELATED APPLICATIONS

This application is a continuation application of PCT Patent Application No. PCT/CN2020/096074, entitled "MACHINE TRANSLATION METHOD AND APPARATUS, ELECTRONIC DEVICE, AND STORAGE MEDIUM" and filed on Jun. 15, 2020, which claims priority to Chinese Patent Application No. 201910611919.7 filed with the China National Intellectual Property Administration on Jul. 8, 2019 and entitled "MACHINE TRANSLATION METHOD AND APPARATUS, ELECTRONIC DEVICE, AND STORAGE MEDIUM", the entire contents of both of which are incorporated herein by reference.

FIELD OF THE TECHNOLOGY

The present disclosure relates to the field of language processing, and in particular, to a machine translation method and apparatus, an electronic device, and a storage medium.

BACKGROUND OF THE DISCLOSURE

Nature language processing (NLP) is an important research direction of computer science artificial intelligence (AI). NLP studies how to implement effective communication between humans and computers through natural languages. NLP is a discipline that integrates linguistics, computer science, and mathematics. Neural machine translation is an important task.

In existing machine translation methods, to improve translation accuracy, a to-be-translated sentence is usually divided into a plurality of clauses according to punctuation marks, and translation is then performed based on the clauses. However, this method still fails to translate accurately when clauses are relatively long. That is, the existing machine translation methods still have shortcomings.

SUMMARY

According to various embodiments provided in the present disclosure, a machine translation method and apparatus, an electronic device, and a storage medium are provided.

A machine translation method is provided, performed by an electronic device, the method including: receiving a sentence, the sentence including a plurality of words; calling a machine translation model obtained through training, the machine translation model including a partitioning model and a translation model; partitioning the sentence based on the partitioning model and according to word vectors of the words, to obtain to-be-translated blocks, each to-be-translated block including at least one of the words; and translating the sentence based on the translation model and the to-be-translated blocks, to obtain a translation result.

A machine translation apparatus is provided, including: a receiving module, configured to receive a sentence, the to-be-translated sentence including words; a calling module, configured to call a machine translation model obtained through training, the machine translation model including a partitioning model and a translation model; a partitioning module, configured to partition the sentence based on the partitioning model and according to word vectors of the words to obtain to-be-translated blocks, each to-be-translated block including at least one of the words; and a translation module, configured to translate the sentence based on the translation model and the to-be-translated blocks to obtain a translation result.

A non-transitory storage medium storing computer-readable instructions is provided, the computer-readable instructions, when executed by one or more processors, causing the one or more processors to perform: receiving a sentence, the sentence including a plurality of words; calling a machine translation model obtained through training, the machine translation model including a partitioning model and a translation model; partitioning the sentence based on the partitioning model and according to word vectors of the words, to obtain to-be-translated blocks, each to-be-translated block including at least one of the words; and translating the sentence based on the translation model and the to-be-translated blocks, to obtain a translation result.

An electronic device is provided, including a memory and a processor, the memory storing computer-readable instructions, the computer-readable instructions, when executed by the processor, causing the processor to perform: receiving a sentence, the sentence including a plurality of words; calling a machine translation model obtained through training, the machine translation model including a partitioning model and a translation model; partitioning the sentence based on the partitioning model and according to word vectors of the words, to obtain to-be-translated blocks, each to-be-translated block including at least one of the words; and translating the sentence based on the translation model and the to-be-translated blocks, to obtain a translation result.

Details of one or more embodiments of the present disclosure are provided in the subsequent accompanying drawings and descriptions. Other features, objectives, and advantages of the present disclosure are illustrated in the specification, the accompanying drawings, and the claims.

BRIEF DESCRIPTION OF THE DRAWINGS

To describe technical solutions in embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

FIG. 15 to FIG. 18 are schematic diagrams of interfaces according to an embodiment of the present disclosure.

DESCRIPTION OF EMBODIMENTS

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure.

Figure 1:
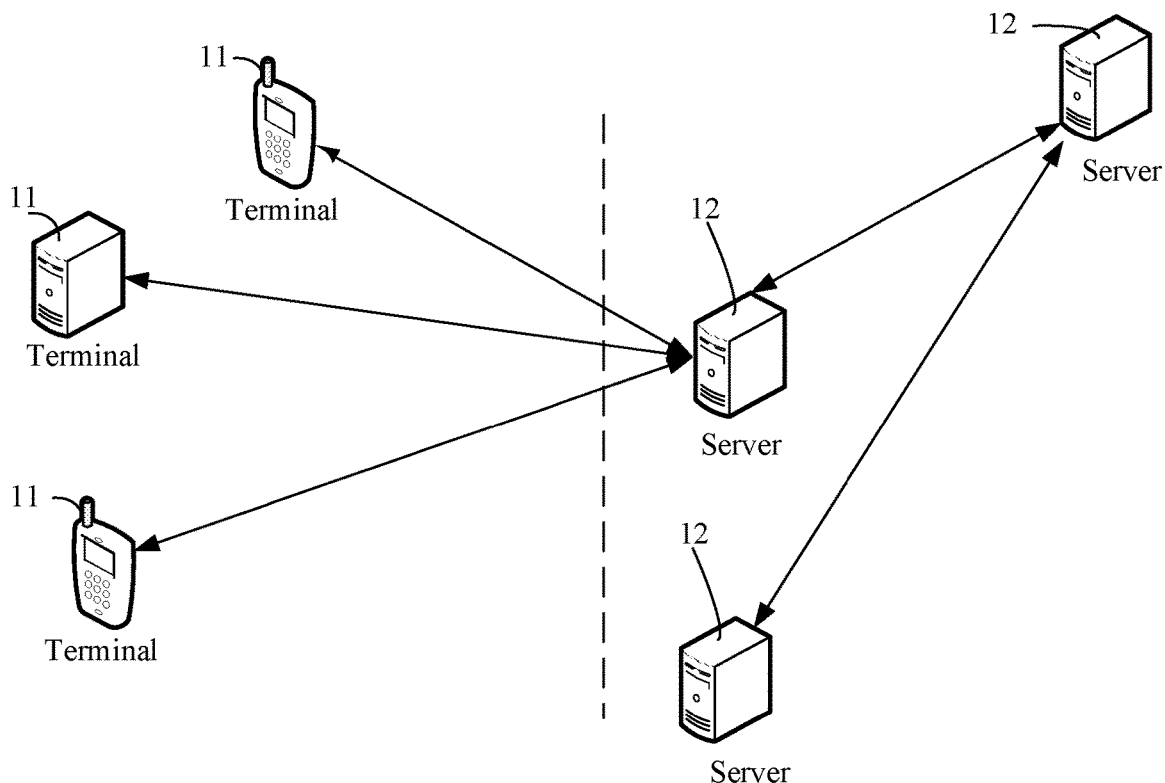
FIG. 1 is a schematic diagram of networking of a machine translation system according to an embodiment of the present disclosure.

FIG. 1 is a schematic diagram of a scenario of a machine translation system to which a machine translation method is applied according to an embodiment of the present disclosure. The system may include a user-side device and a service-side device. For example, the user-side device and the service-side device are connected through Internet composed of various gateways. The user-side device includes a plurality of terminals 11, and the service-side device includes a plurality of servers 12.

The terminal 11 includes, but is not limited to, a portable terminal such as a mobile phone or a tablet computer installed with an instant messaging application (APP) and a fixed terminal such as a computer, a query machine, and an advertisement machine. The terminal is a service port that may be used by a user, and is referred to as a client hereinafter. For example, the terminal is a mobile phone downloaded with a chat APP. In the present disclosure, the client provides a to-be-translated sentence input function, a translation result display function, and the like.

The server 12 provides instant messaging users with various services and application layer support, and includes a data server, a training server, a translation server, a storage server, and the like. The data server is configured to preprocess data. The training server is configured to train a machine model. The translation server is configured to translate according to the machine model.

In this embodiment of the present disclosure, after receiving a to-be-translated sentence, the translation server 12 calls a machine translation model obtained through training, the machine translation model including a partitioning model and a translation model; then partitions the to-be-translated sentence based on the partitioning model and according to word vectors of to-be-translated words to obtain to-be-translated blocks; and finally translates the to-be-translated sentence based on the translation model and the to-be-translated blocks to obtain a translation result.

In the present disclosure, the partitioning model partitions a to-be-translated sentence according to word vectors to obtain to-be-translated blocks. In this case, the to-be-translated sentence may be divided into to-be-translated blocks with smaller sizes. Further, when the translation model translates based on the to-be-translated blocks, translation results corresponding to the to-be-translated blocks are more accurate. Therefore, a translation result of the entire to-be-translated sentence obtained by combining the translation results corresponding to the to-be-translated blocks is more accurate, thereby improving accuracy of machine translation.

The schematic scenario diagram of the system shown in FIG. 1 is merely an example. The server and the scenario described in the embodiments of the present disclosure are intended to more clearly describe the technical solutions in the embodiments of the present disclosure, and do not constitute a limitation on the technical solutions provided in the embodiments of the present disclosure. A person of ordinary skill in the art may learn that, with evolution of the system and appearance of a new service scenario, the technical solutions provided in the embodiments of the present disclosure also apply to a similar technical problem.

The machine translation method provided in the present disclosure is described in detail below.

Figure 2:
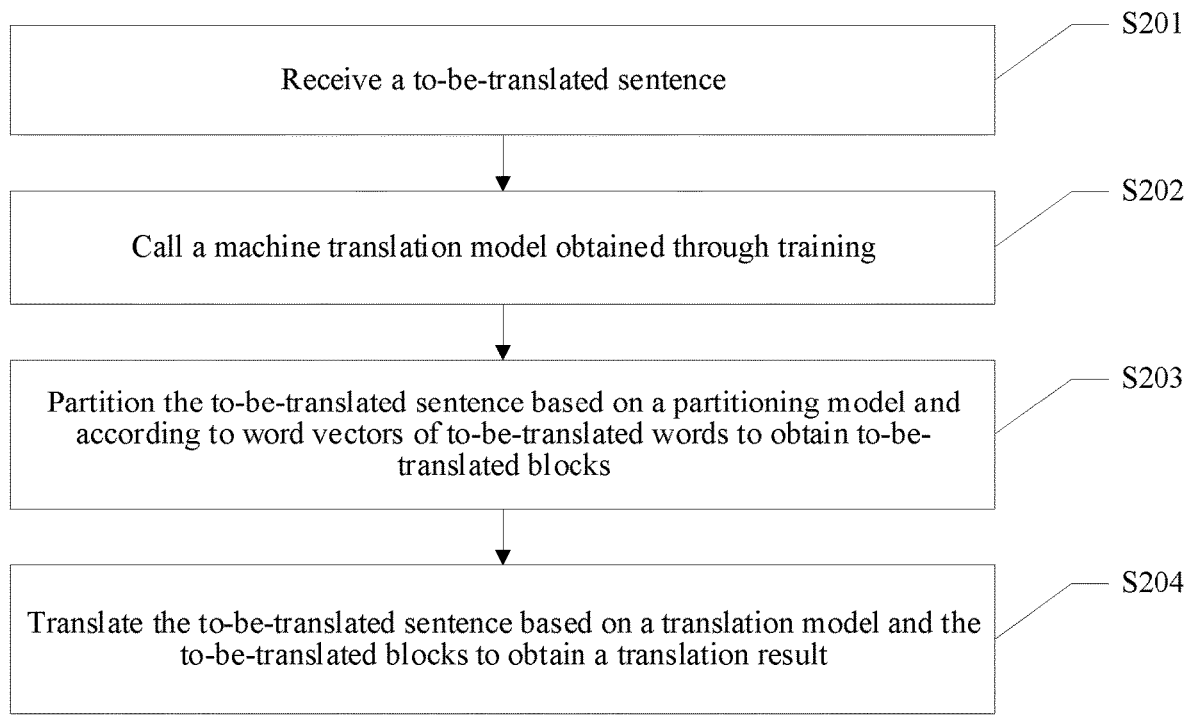
FIG. 2 is a first schematic flowchart of a machine translation method according to an embodiment of the present disclosure.

FIG. 2 is a first schematic flowchart of a machine translation method according to an embodiment of the present disclosure. Referring to FIG. 2, the machine translation method includes the following steps:

S201: Receive a to-be-translated sentence.

The to-be-translated sentence is a sentence that a user needs to translate, and may be a sentence, a paragraph, content in an article, or the like.

The to-be-translated sentence includes to-be-translated words. The to-be-translated word may be one character or word such as " 上 " or " 下 " or may be one phrase or idiom such as " 危险 " or may be one punctuation mark such as "". A to-be-translated word is a basic composition unit of a to-be-translated sentence.

A to-be-translated sentence may be received in various manners. For example, the machine translation method provided in the present disclosure is performed by a terminal, and the terminal may directly obtain a to-be-translated sentence inputted by a user for translation. If the method is performed by a server, after receiving a to-be-translated sentence inputted by the user, the terminal needs to transmit, the to-be-translated sentence to the server. The following is described with reference to embodiments.

In an embodiment, after S201, the method shown in FIG. 2 further includes the following steps: preprocessing the to-be-translated sentence to obtain a preprocessed text; and performing word segmentation on the preprocessed text to obtain to-be-translated words corresponding to the to-be-translated sentence.

For example, after this step is performed on a to-be-translated sentence " 一旦有险情，能召之即来、来之能战。", to-be-translated words including " 一旦 ", " 有 ", " 险情 ", "", " 能召之即来 ", " 、 ", " 来之能战 ", and " 。 " are obtained.

To further reduce subsequent workload, the to-be-translated words may be combined according to association relationships between the to-be-translated words. Specifically, after the step of obtaining the to-be-translated words corresponding to the to-be-translated sentence, the method shown in FIG. 2 further includes: obtaining association relationships between the to-be-translated words; combining to-be-translated words having an association relationship into one to-be-translated word.

An association relationship refers to a probability that two or more to-be-translated words are translated together or the like. For example, three to-be-translated words of "

能召之即来", "、", and "来之能战" usually translated together into "people can come and fight immediately". Therefore, the three to-be-translated words may be combined into one to-be-translated word "能召之即来,来之能战".

S202: Call a machine translation model obtained through training.

The machine translation model includes a partitioning model and a translation model, and a specific training process of the machine translation model is described below.

S203: Partition the to-be-translated sentence based on a partitioning model and according to word vectors of to-be-translated words to obtain to-be-translated blocks.

The to-be-translated block includes at least one to-be-translated word. According to a partitioning result, the to-be-translated block may only include one to-be-translated word such as "一旦" or may include a plurality of to-be-translated words such as "能召之即来、来之能战". A to-be-translated word is a basic unit for subsequent translation.

In an embodiment, this step includes the following steps: obtaining a word representation of a current to-be-translated word and a block representation of a current to-be-translated block according to the word vectors of the to-be-translated words; obtaining an attribution relationship between the current to-be-translated word and the current to-be-translated block based on the partitioning model and according to the word representation of the current to-be-translated word and the block representation of the current to-be-translated block; and partitioning the to-be-translated sentence based on the partitioning model and the attribution relationship to obtain the to-be-translated blocks.

In the machine model, a text is prompted in a manner of a vector. A to-be-translated word may be converted into a corresponding word vector by using a trained model, and a hidden state representation of the to-be-translated word in the model, for example, a word representation of a current to-be-translated word and a block representation of a current to-be-translated block, may be obtained according to the word vector.

S204. Translate the to-be-translated sentence based on a translation model and the to-be-translated blocks to obtain a translation result.

The translation model may be a neural model based on a convolutional neural network (CNN), or may be a neural model based on a recurrent neural network (RNN). The translation model is obtained through training. This step is described below with reference to embodiments.

According to a machine translation method provided in this embodiment, after receiving a to-be-translated sentence, a machine translation model obtained through training is called, the machine translation model including a partitioning model and a translation model; the to-be-translated sentence is then partitioned based on the partitioning model and according to word vectors of to-be-translated words to obtain to-be-translated blocks; and the to-be-translated sentence is finally translated based on the translation model and the to-be-translated blocks to obtain a translation result, thereby improving accuracy of machine translation.

Figure 3:
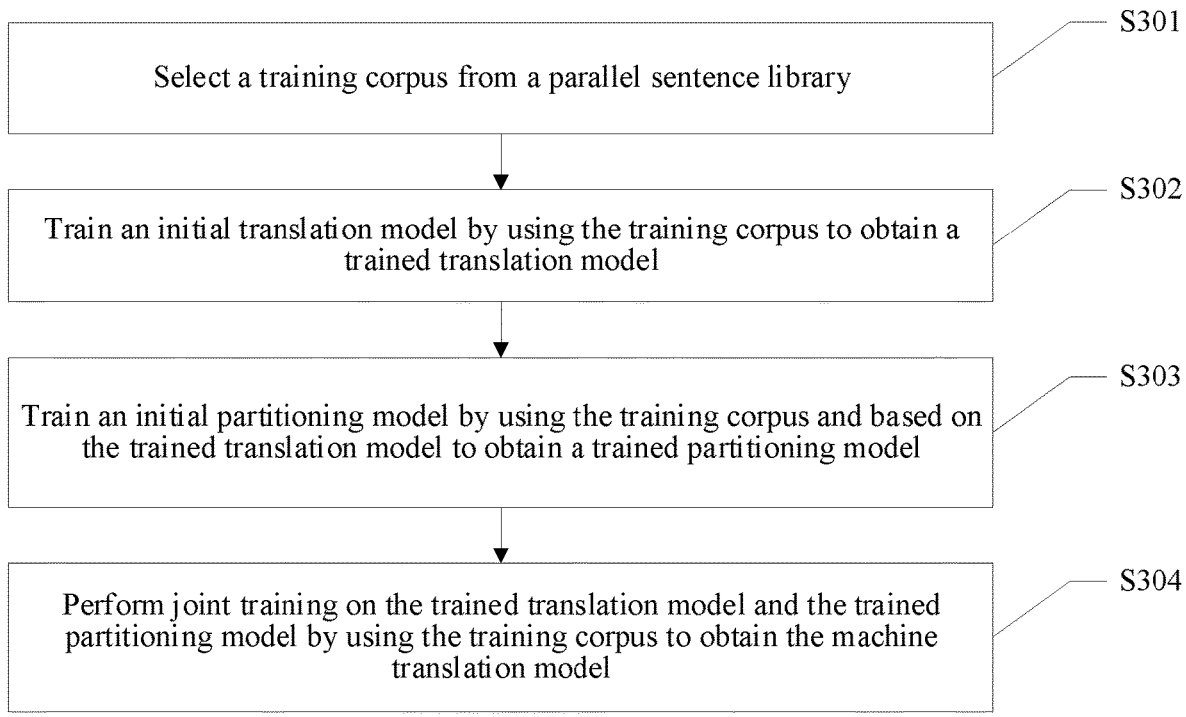
FIG. 3 is a second schematic flowchart of a machine translation method according to an embodiment of the present disclosure.

FIG. 3 is a second schematic flowchart of a machine translation method according to an embodiment of the present disclosure. Referring to FIG. 3, the machine translation method includes a training step of the machine translation model, and specifically includes the following steps:

S301: Select a training corpus from a parallel sentence library.

The parallel sentence library includes at least one parallel sentence pair. In the parallel sentence library, a quantity of the parallel sentence pairs is generally at the level of ten thousand or one million.

To ensure a training result, the quantity of the parallel sentence pairs included in the training corpus may be at the level of ten thousand or the like.

Figures 10, 11:
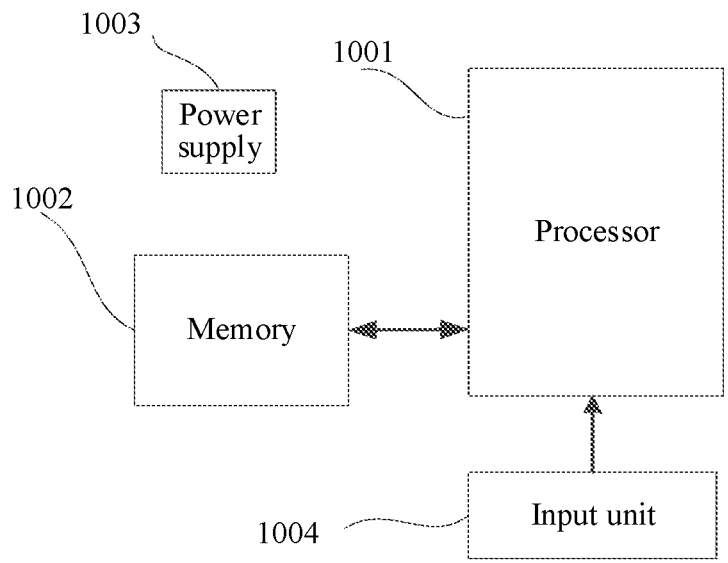
FIG. 10 is a schematic structural diagram of a server according to an embodiment of the present disclosure.
FIG. 11 to FIG. 14 are schematic diagrams of models according to an embodiment of the present disclosure.

As shown in FIG. 11, one parallel sentence pair includes one source sentence and one target sentence. For example, for a Chinese-English machine translation model, a source sentence is a Chinese sentence "一旦有险情，能召之即来来之能战。", and a target sentence is an English sentence "Once an emergency occurs, people can come and fight immediately."

A parallel sentence pair may be translated by a language expert. This manner is simple to implement but requires high costs. A parallel sentence pair may be alternatively historical data providing a translation service to a user in the early stage or the like, for example, may be a translation result obtained by translating a to-be-translated sentence inputted by a user. If the user does not change the translation result, the to-be-translated sentence is used as a source sentence and the translation result is used as a target sentence. If the user changes the translation result, a translation result changed by the user is used as a target sentence, thereby reducing costs.

In an embodiment, during selection of a training corpus from the parallel sentence library, a parallel sentence pair provided by a language expert is optimized, or a parallel sentence pair with a high percentage of user acceptance is optimized.

In an embodiment, after S301, the method shown in FIG. 3 further includes: performing word alignment on the parallel sentence pair in the training corpus; determining candidate partitioning positions according to an alignment result; and partitioning the source sentence in the training corpus based on the initial partitioning model and the candidate partitioning positions to obtain the blocks of the source sentence.

S302: Train an initial translation model by using the training corpus to obtain a trained translation model.

S303: Train an initial partitioning model by using the training corpus and based on the trained translation model to obtain a trained partitioning model.

In an embodiment, S303 includes: partitioning a source sentence in the training corpus based on the initial partitioning model to obtain blocks of the source sentence; translating the source sentence based on the blocks of the source sentence and the trained translation model to obtain a translated sentence corresponding to the source sentence; obtaining a partitioning expected value of the initial partitioning model according to the translated sentence corresponding to the source sentence and a target sentence; and training the initial partitioning model according to an optimal principle of the partitioning expected value to obtain the trained partitioning model.

In an embodiment, the obtaining a partitioning expected value of the initial partitioning model according to the translated sentence corresponding to the source sentence and a target sentence includes: obtaining a likelihood parameter of the translated sentence corresponding to the source sentence and the target sentence; obtaining the partitioning expected value of the initial partitioning model according to the likelihood parameter.

In an embodiment, the obtaining a partitioning expected value of the initial partitioning model according to the translated sentence corresponding to the source sentence and a target sentence further includes: obtaining a block quantity of the source sentence and a word quantity of the source sentence; obtaining a penalty parameter according to the block quantity and the word quantity; and obtaining the partitioning expected value of the initial partitioning model according to the likelihood parameter and the penalty parameter.

In an embodiment, the partitioning model includes a similarity function; and the operation of partitioning a source sentence in the training corpus based on the initial partitioning model to obtain blocks of the source sentence includes: obtaining a block representation of a current block and a word representation of a current word that are in the source sentence; obtaining a similarity between the current word and the current block based on the similarity function; determining an attribution relationship between the current word and the current block according to the similarity; and partitioning the source sentence according to the attribution relationship to obtain the blocks of the source sentence.

S304: Perform joint training on the trained translation model and the trained partitioning model by using the training corpus to obtain the machine translation model.

In an embodiment, S304 includes:

obtaining a translation expected value of the translation model and a partitioning expected value of the partitioning model; obtaining a model expected value according to the translation expected value and the partitioning expected value; and performing joint training on the trained translation model and the trained partitioning model according to an optimal principle of the model expected value to obtain the machine translation model.

An example in which the machine translation model provided in the present disclosure is implemented by using an RNN is used to further describe this embodiment of the present disclosure.

Figure 12:
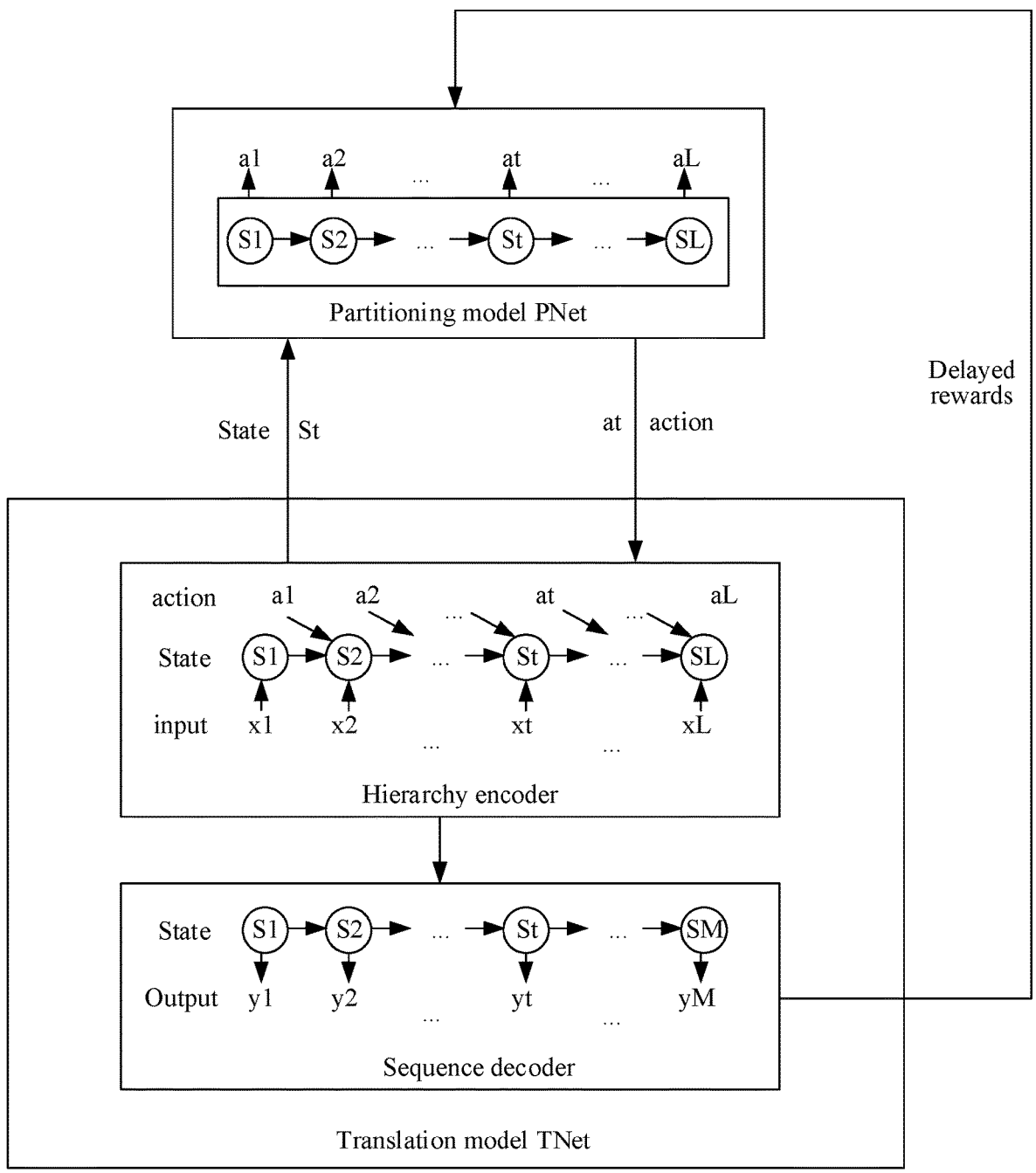

In an embodiment, as shown in FIG. 12, the machine translation model provided in this embodiment includes a partitioning model (partitioning network, PNet) and a translation model (translation network, TNet). To preserve alignment information of the parallel sentence pairs in the training corpus, the sentence pairs need to be preprocessed to obtain the candidate partitioning positions.

Figure 13:
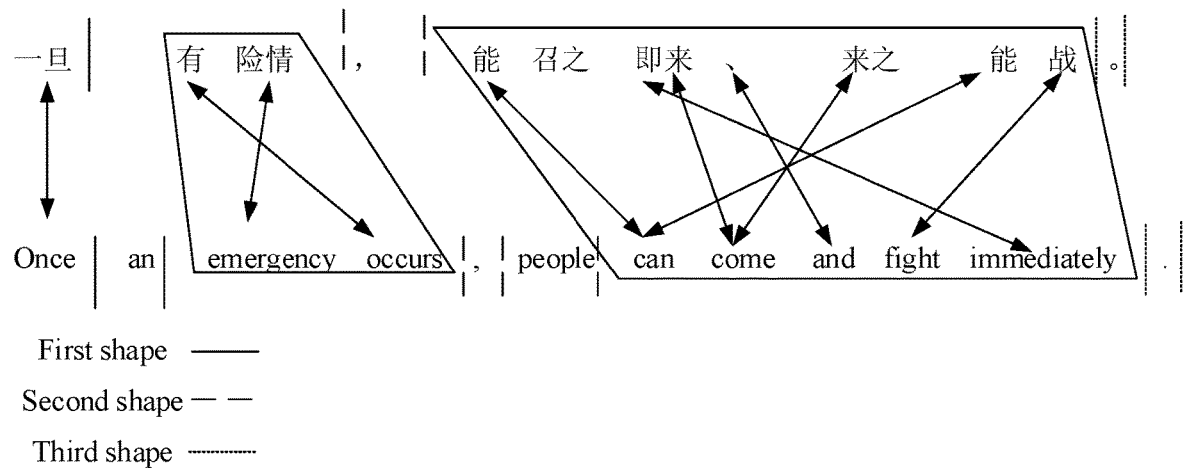

In an embodiment, this step includes: performing word alignment analysis on the parallel sentence pairs by using a word alignment tool Giza++, and an alignment result is shown in FIG. 13.

The candidate partitioning positions are found according to the alignment result.

In the alignment result shown in FIG. 13, there are alignment and cross parts, and the insides of the alignment and cross parts cannot be partitioned, and positions other than the parts are all candidate positions. All vertical lines in FIG. 13 are candidate partitioning positions.

The candidate partitioning positions are grouped.

To keep a bilingual alignment relationship, partitioning is performed at all the candidate partitioning positions according to a sequence in which the positions appear in a sentence, and candidate partitioning positions with vertical lines of the same shape shown in FIG. 13 are grouped into one group. In each group of candidate positions, a quantity of times in which the source sentence is partitioned is the same as that of the target sentence.

Figure 14:
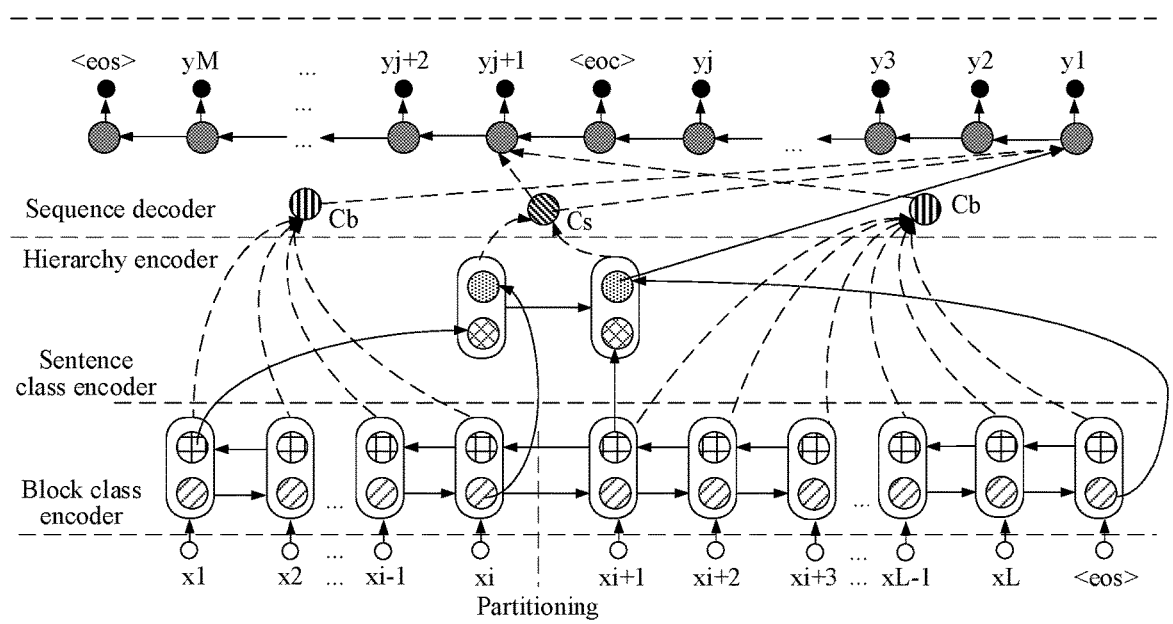

In an embodiment, as shown in FIG. 14, TNet includes a hierarchy encoder and a sequence decoder.

The hierarchy encoder includes two classes, namely, a block class encoder and a sentence class encoder.

As shown in FIG. 14, the block class encoder includes a bidirectional RNN, and the bidirectional RNN first obtains a word representation of each word according to a word vector of the word:

$$H^w = BiRNN(W),$$

where W is a word vector of an inputted to-be-translated word, $H^w$ is a hidden state representation corresponding to the inputted word vector, that is, a word representation of the to-be-translated word.

The bidirectional RNN then determines composition of each to-be-translated block according to a partitioning result. For example, for a to-be-translated block k, a start position is a to-be-translated word $B_i$, and an end position is a to-be-translated word $B_j$. Therefore, a block representation Bk of the to-be-translated block is:

$$Bk = H_{i,j}^w = \overrightarrow{H_j^w} \oplus \overleftarrow{H_i^w},$$

where $\overrightarrow{H_j^w}$ is a hidden state representation at the last moment during forward encoding of the to-be-translated block, and $\overleftarrow{H_i^w}$ is a hidden state representation at the last moment during backward encoding of the to-be-translated block.

As shown in FIG. 14, the sentence class encoder includes a unidirectional RNN. Block representations Bk of all to-be-translated blocks in a sentence are inputted into the RNN sequentially for encoding to obtain a sentence representation $H^B$ of the sentence:

$$H^B = RNN(B1, \ldots, Bk).$$

The sequence decoder is configured to combine translation results corresponding to to-be-translated blocks together according to context information to obtain a translation result of a sentence. The context information $p(y_t)$ of the sequence decoder is from two attention modules, that is, block class context information $C_B$ obtained by a block class attention module and sentence class context information $C_S$ obtained by a sentence class attention module:

$$p(y_t) = RNN(y_{t-1}, C_B, C_S),$$

where $y_{t-1}$ is context information outputted last time.

The block class context information $C_B$ is obtained by the block class attention module:

$$C_B = AttB(y_{t-1}, H_{i,j}^w),$$

where $y_{t-1}$ is block class context information outputted last time, and AttB is a block class attention function.

The sentence class context information $C_S$ is obtained by the sentence class attention module:

$$C_S = AttS(y_{t-1}, H^B),$$

where $y_{t-1}$ is sentence class context information outputted last time, and AttS is a sentence class attention function.

When the decoder generates an end of block, decoding of a new block is started.

The partitioning model PNet is configured to determine, by learning a degree of correlation between a current word and a current block, whether to perform partitioning at a current position, that is, determine whether the current word belongs to the current block or a new block. For example, if the current word and the current block have a high similarity, the current word belongs to the current block, and the partitioning is not performed at this position; and if the current word and the current block have a low similarity, the current word does not belong to the current block, decoding of a new block is started, and partitioning is performed at this position.

The partitioning model PNet may be:

$$p(a_t)=f(B_{k-1}, H_t^w),$$

where a represents an action that can be taken by a policy network, the action including partitioning and skipping partitioning; and $f$ may be any function, for example, a linear function, and is a training object of the partitioning model.

In this embodiment, a target function of the machine translation model is:

$$J = J_{TNet} + J_{PNet},$$

where $J_{TNet}$ is a translation expected value of the translation model; $J_{PNet}$ is a partitioning expected value of the partitioning model; and J is an overall model expected value of the machine translation model.

In a case that the translation expected value of the translation model is $J_{TNet}$:

$$J_{TNet}(\Theta_{TNet}) = \log(Y|X, \Theta_{TNet}),$$

where $\Theta_{TNet}$ is a parameter with which the translation model may be configured, and $\log(Y|X, \Theta_{TNet})$ is a log likelihood value of a translation result Y that is obtained when the translation model translates a source sentence by using a parameter $\Theta_{TNet}$ and a target sentence X that corresponds to the source sentence.

If the training corpus includes n parallel sentence pairs, $$J_{TNet}(\Theta_{TNet}) = \log(Y|X, \Theta_{TNet}) = \Sigma_n(\log(y|x, \Theta_{TNet})),$$

where $\log(y|x, \Theta_{TNet})$ is a log likelihood value of a translation result y that is obtained when the translation model translates a source sentence in the n parallel sentence pairs by using a parameter $\Theta_{TNet}$ and a target sentence x that corresponds to the source sentence.

For the partitioning expected value $J_{PNet}(\Theta_{PNet})$ of the partitioning model:

$$J_{PNet}(\Theta_{PNet}) = \log(Y|X, \Theta_{PNet}),$$

where $\Theta_{PNet}$ is a parameter with which the partitioning model may be configured, a parameter of the partitioning model generally being a function coefficient, threshold, or the like; and $\log(Y|X, \Theta_{PNet})$ is a log likelihood value of a translation result Y that is obtained when a source sentence is translated based on a partitioning result obtained by partitioning a source sentence by using a parameter $\Theta_{PNet}$ and a target sentence X that corresponds to the source sentence.

$$J_{PNet}(\Theta_{PNet}) = \log(Y|X, \Theta_{PNet}) = \Sigma(P(A)\log(Y|X, \Theta_{PNet}, A)),$$

where A is a partitioning result, and P(A) is a probability that the partitioning model obtains the partitioning result A.

The partitioning model aims to find an optimal partitioning method for a sentence to improve a translation result of a translation model. Because of the lack of real partitioning data, reinforcement learning may be used to train the policy network to enable the policy network to automatically learn the optimal partitioning method. During training, the reinforcement learning obtains a plurality of parameters $\Theta_{PNet}$ by sampling, obtains a plurality of partitioning methods based on these parameters $\Theta_{PNet}$, and uses a log likelihood value of a translation result obtained by the translation model during training and a target sentence as a return value of each partitioning method. Reinforcement learning trains parameters of the partitioning model to maximize an expected value $J_{PNet}(\Theta_{PNet})$ of the return.

To avoid excessive partitioning, in an embodiment of the present disclosure, a partitioning times penalty item, that is, a penalty parameter Γ, is added to the return of the partitioning model, to punish a manner with a relatively large or small quantity of times of partitioning. In this case, $$J_{PNet}(\Theta_{PNet}) = \log(Y|X, \Theta_{PNet}) - \lambda \Gamma, \text{ and}$$

$$\Gamma = (L'/L + 0.1 L/L'),$$

where L' is a quantity of blocks obtained after a sentence is partitioned, L is a quantity of words in the sentence, and λ is a weighting coefficient corresponding to the penalty parameter Γ.

Figure 4:
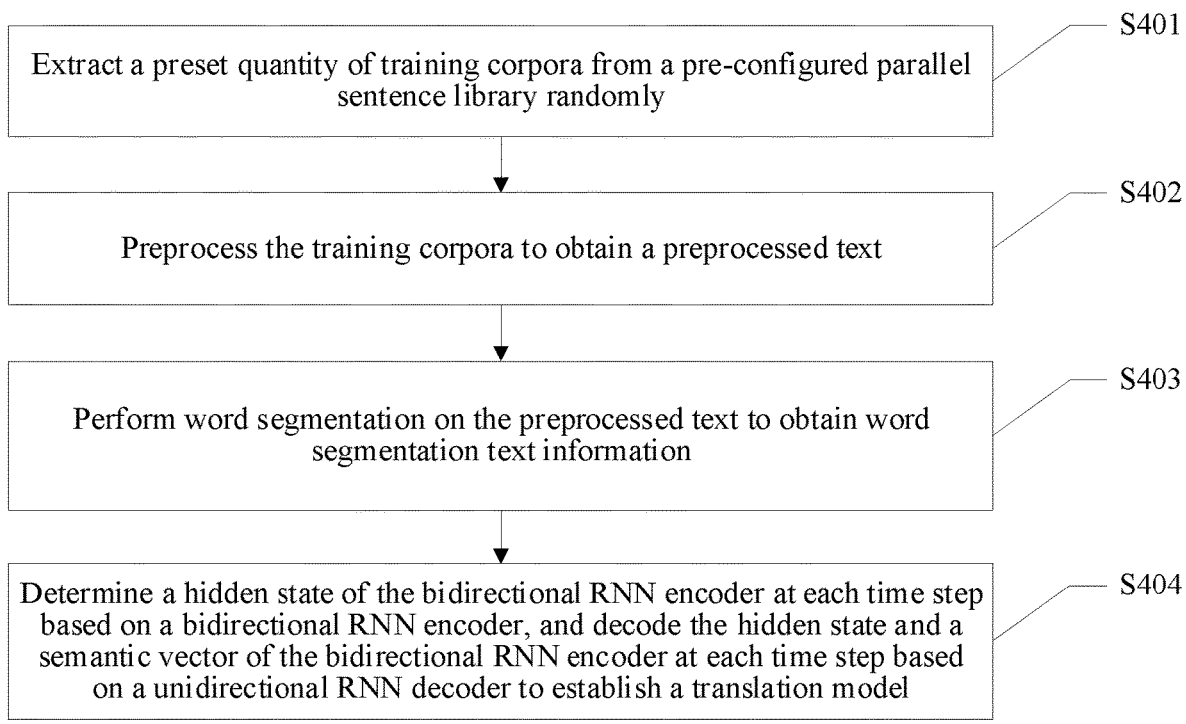
FIG. 4 is a third schematic flowchart of a machine translation method according to an embodiment of the present disclosure.

FIG. 4 is a third schematic flowchart of a machine translation method according to an embodiment of the present disclosure. How to train an initial translation model to obtain a trained translation model is described in this embodiment. Referring to FIG. 4, the machine translation method includes the following steps:

S401: Extract a preset quantity of training corpora from a pre-configured parallel sentence library randomly.

A parallel sentence library, also referred to as a translation corpus library, is a corpus library including source texts and target texts, and is used for training and testing a machine translation model, and may be, for example, a corpus library including source texts and target texts such as Chinese and Uyghur, Chinese and English, Chinese and Japanese, and Japanese and English.

According to this step, the preset quantity of training corpora may be extracted from a parallel sentence library randomly. For example, parallel sentence pairs of Chinese and English texts at the level of ten thousand or one million are obtained from a parallel sentence library including Chinese and English texts. English texts may be defined as target sentences, and Chinese texts may be defined as source sentences.

S402: Preprocess the training corpora to obtain a preprocessed text.

Preprocessing such as regularization, error correction, and digital regularization may be performed on the training corpus in this step.

S403: Perform word segmentation on the preprocessed text to obtain word segmentation text information.

The word segmentation may be performed after the training corpora are preprocessed to obtain the word segmentation text information of the training corpora. For example, the word segmentation is performed on a preprocessed source sentence to obtain word segmentation text information of the source sentence. For example, a processed source sentence is "我今天中午不吃饭了", and word segmentation text information such as "我", "今", "天", "中", "午", "不", "吃", "饭", "了", and "。" at the character level may be obtained after the word segmentation.

S404: Encode the word segmentation text information forward and backward based on a bidirectional RNN encoder, determine a hidden state of the bidirectional RNN encoder at each time step, and decode the hidden state and a semantic vector of the bidirectional RNN encoder at each time step based on a unidirectional RNN decoder to establish a translation model.

In an embodiment, the translation model may be established by encoding and decoding the word segmentation text information. Specifically, in this case, this step includes the following steps:

S404-1: The forward RNN encodes the word segmentation text information forward to obtain a forward word vector feature sequence $X_F=(X_1, X_2, \ldots, X_t)$, and generates a forward hidden state $Fh_i$ at each time step i:

$$Fh_i=(Fh_1, Fh_2, \ldots, Fh_t),$$

where i=1, 2, . . . , t; and F represents a forward hidden state parameter of the translation model.

In an embodiment of the present disclosure, a dictionary may be preset. In the dictionary, each character corresponds to one unique code, and the code of the each character is unique in the dictionary. Codes of characters corresponding to the word segmentation text information may be found by using the dictionary, and the codes may form the forward word vector feature sequence in order.

For example, in the dictionary, codes of the following characters are as follows: "我": 102, "今": 38, "天": 5, "申": 138, "午": 321, "不": 8, "吃": 29, "饭": 290, "了": 202, "。": 0. Therefore, a forward word vector feature sequence of the word segmentation text information: "我", "今", "天", "申", "午", "不", "吃", "饭", "了", and "。" is [102, 38, 5, 138, 321, 8, 29, 290, 202, 0].

In addition, the forward word vector feature sequence is inputted into the forward RNN, for the RNN to calculate a forward hidden state $Fh_i$ at each time step i according to a preset forward hidden state parameter Γ, to obtain forward hidden states $Fh_i=(Fh_1, Fh_2, \ldots, Fh_t)$ at all the time steps, i=1, 2, . . . , t, t being the time step.

S404-2: The backward RNN encodes the word segmentation text information backward to obtain a backward word vector feature sequence $X_B=(X_t, \ldots, X_2, X_1)$, and generates a backward hidden state $Bh_i$ at each time step i:

$Bh_i=(Bh_1, Bh_2, \ldots, Bh_t)$, where i=1, 2, . . . , t, and B represents a backward hidden state parameter of the translation model.

For example, for the word segmentation text information "我", "今", "天", "申", "午", "不", "吃", "饭", "了", and "。" in S404-1, a backward word vector feature sequence obtained after the encoding of the backward RNN is [0, 202, 290, 29, 8, 321, 138, 5, 38, 102].

In addition, the backward word vector feature sequence is inputted into the backward RNN, for the RNN to calculate a backward hidden state $Bh_i$ at each time step i according to a preset backward hidden state parameter B, to obtain backward hidden states $Bh_i=(Bh_1, Bh_2, \ldots, Bh_t)$ at all the time steps, i=1, 2, . . . , t, t being the time step.

S404-3: Determine a hidden state $h_i$ of the bidirectional RNN encoder at each time step according to the forward hidden state $Fh_i$ and the backward hidden state $Bh_i$, where $h_i=(Fh_i, Bh_i)$.

The unidirectional RNN decoder performs decoding for each time step by using only one hidden state, and therefore, a hidden state of the bidirectional RNN encoder at each time step needs to be determined. Specifically, the hidden state $h_i=(Fh_i, Bh_i)$ of the bidirectional RNN encoder at each time step i may be comprehensively determined according to a forward hidden state $Fh_i$ and a backward hidden state $Bh_i$ at each time step i, for example, the hidden state $h_i$ at each time step i may be determined by using a sum or the like.

S404-4: Decode the hidden state and the semantic vector of the bidirectional RNN encoder at each time step based on an undirected RNN decoder to obtain a decoded state function of the translation model.

In an embodiment, this step may include:

obtaining a decoded state $S_{i-1}$ and a corresponding label $Y_{i-1}$ of the undirected RNN decoder at a time step i−1;

obtaining a hidden state $h_i$ and a semantic vector $C_i$ of the bidirectional RNN encoder at a current time step i; and determining a decoded state $S_i$ of the corresponding undirected RNN decoder at the current time step i according to the decoded state $S_{i-1}$, the label $Y_{i-1}$, the hidden state $h_i$, and the semantic vector $C_i$, where $S_i=P(S_{i-1}, Y_{i-1}, h_i, C_i)$, P representing a decoded state function.

The semantic vector $C_i$ instructs the unidirectional RNN decoder to select the most suitable context information when outputting each segmented word of a predicted target sentence. Specifically, the semantic vector $C_i$ may be a weighted sum of the hidden state $h_i=(h_1, h_2, \ldots, h_t)$ of the bidirectional RNN encoder.

Compared with the bidirectional RNN encoder, the unidirectional RNN decoder has no direction during decoding, and therefore, in addition to the hidden state $h_i$ of the bidirectional RNN encoder at each time step, reference is also made to the semantic vector $C_i$ of the bidirectional RNN encoder at each time step during decoding. The state $S_i$ of the decoder at the time step i is jointly determined by the state $S_{i-1}$ and the corresponding label $Y_{i-1}$ of the decoder at the time step i−1 and the hidden state $h_i$ and the semantic vector $C_i$ of the bidirectional RNN encoder aligned at a current moment. Therefore, the undirected RNN decoder can perform decoding with reference to different semantic vectors at each time step, to avoid problems that the context information is diluted or covered because all the information is compressed into a fixed-length vector and that translation accuracy of the translation model is low because the decoder performs decoding with reference to the same fixed-length vector at each time step. Therefore, the decoder performs decoding with reference to different semantic vectors at each time step, thereby improving accuracy of translating the source sentence by using the translation model.

In an embodiment, the method shown in FIG. 4 may further include the following steps: extracting a training target corpus aligned with the training corpus from the parallel sentence library; calculating, according to the decoded state function, a probability of the target corpus predicted by each training corpus; calculating a loss ratio according to a preset loss function and the probability; and calculating a gradient by using the loss ratio.

In this embodiment of the present disclosure, the training corpus and the training target corpus in the parallel sentence library may be paired, and the training target corpus aligned with the training corpus may be extracted from the parallel sentence library.

Before training, model parameters, a learning rate, and a quantity of iteration times in the translation model are initialized into initial values. Randomly extracted training corpora are then inputted into the translation model, and candidate target corpora are extracted. There may be a plurality of candidate target corpora, and the training target corpus is also included. Each candidate target corpus has a score, for example, may be a probability that each candidate target corpus belongs to the target training corpus aligned with the training corpus. For example, the probability that the candidate target corpus belongs to the training target corpus may be calculated in a multiple regression manner.

During training, a score of the target training corpus may be different from an actual calculated score. That is, there are deviations in prediction results. Therefore, the parameters of the translation model need to be adjusted according to the loss ratio, and further, the loss ratio may be calculated according to the preset loss function and the probability.

After the loss ratio is obtained, the gradient may be calculated to adjust the parameters of the model. During actual application, the gradient may be calculated according to the loss ratio in the partial derivative manner.

It is determined whether the gradient satisfies a preset iteration condition, and training of the translation model is ended if the gradient satisfies the condition, and gradient descent is performed on the model parameters of the translation model by using the gradient and a preset learning rate if the gradient does not satisfy the condition, the model parameters including a forward hidden state parameter and a backward hidden state parameter; and the process returns to the step of extracting a training target corpus aligned with the training corpus from the parallel sentence library.

If the calculated gradient does not satisfy the preset iteration condition, for example, differences between a plurality of consecutive gradients are greater than or equal to a preset difference threshold or the quantity of iteration times is not reached, the model parameters of the translation model are updated. For example, the forward hidden state parameter and the backward hidden state parameter of the translation model are adjusted. A next round of iteration is performed by using updated model parameters and the preset learning rate. Otherwise, if the gradient satisfies the preset iteration condition, for example, the differences between the plurality of consecutive gradients are less than the preset difference threshold or the quantity of iteration times is reached, the training is ended, and the model parameters are outputted.

During the training, the gradient descent is performed by using stochastic gradient descent (SGD), Adadelta, and adaptive moment estimation (Adam). In addition, the loss ratio is calculated by using the following loss functions: maximum likelihood estimation (MLE), minimum risk training (MRT), and semi-supervised training (SST). The mentioned descent methods and the used loss functions are not limited in this embodiment of the present disclosure.

Figure 5:
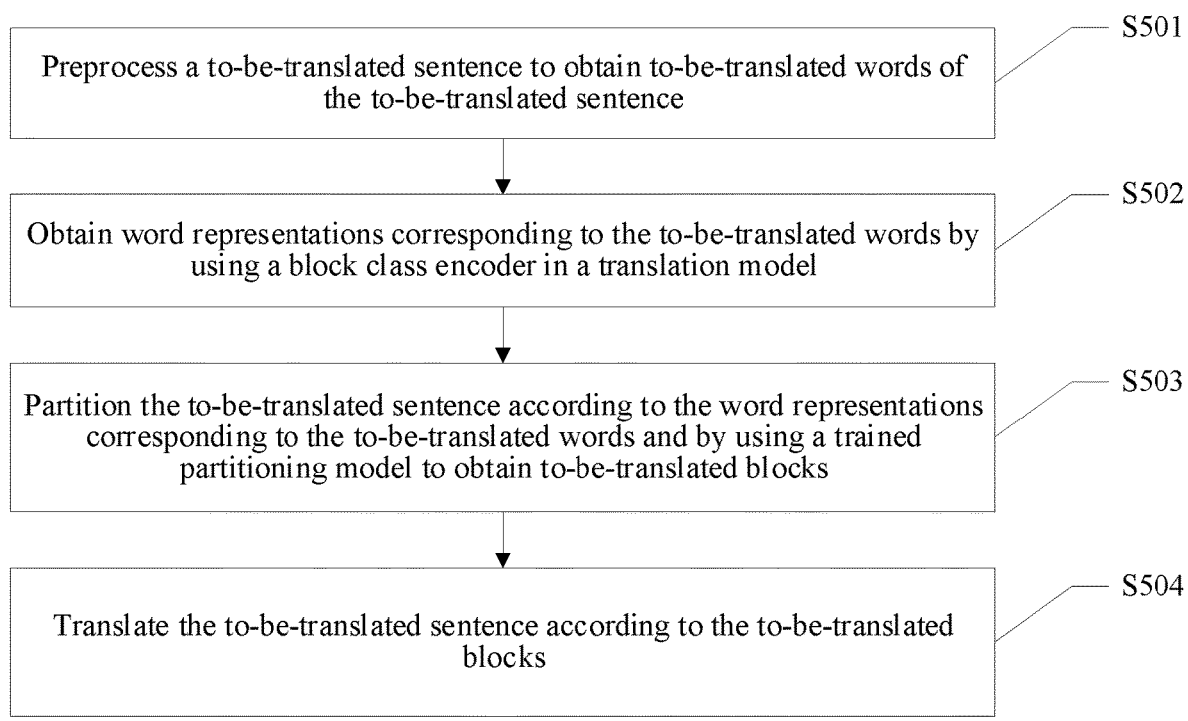
FIG. 5 is a fourth schematic flowchart of a machine translation method according to an embodiment of the present disclosure.

FIG. 5 is a fourth schematic flowchart of a machine translation method according to an embodiment of the present disclosure. How to train the initial partitioning model to obtain a trained partitioning model is described in this embodiment. Referring to FIG. 5, the machine translation method includes the following steps:

S501: Preprocess a to-be-translated sentence to obtain to-be-translated words of the to-be-translated sentence.

The to-be-translated sentence is preprocessed to obtain a preprocessed text; and word segmentation is performed on the preprocessed text to obtain the to-be-translated words corresponding to the to-be-translated sentence.

For example, a to-be-translated sentence X is processed to obtain to-be-translated words x=(x1, x2, . . . , xt), and the to-be-translated words X are used as an input of a block class encoder.

S502: Obtain word representations corresponding to the to-be-translated words by using a block class encoder in a translation model.

A word representation $H_i^w$ of each word i is obtained according to a word vector Wi of each word and by using a block class encoder of a trained translation model, where $H_i^w$=BiRNN(Wi).

S503: Partition the to-be-translated sentence according to the word representations corresponding to the to-be-translated words and by using a trained partitioning model to obtain to-be-translated blocks.

The to-be-translated word x1 is directly used as the first to-be-translated block 1. In this case, the to-be-translated block 1 is (x1), a block representation B1=$H_{1,1}^w$=$\overrightarrow{H_1^w}$⊕$\overleftarrow{H_1^w}$ corresponding to the to-be-translated block 1 is obtained from the block class encoder.

For the to-be-translated word x2, a word representation $H_2^w$ corresponding to the to-be-translated word x2 is obtained by using the block class encoder.

The partitioning model PNet is p($a_t$)=ƒ($B_{k-1}$,$H_t^w$). In this case, for the to-be-translated word x2, a result outputted by the partitioning model is: p($a_2$)=ƒ($B_1$, $H_2^w$), and it is determined by using a function ƒ, whether a similarity between the to-be-translated word x2 and the to-be-translated block 1 is relatively high. oan If the similarity between the to-be-translated word x2 and the to-be-translated block 1 is relatively high, the to-be-translated word x2 belongs to the to-be-translated block 1, and the to-be-translated block 1 is updated into (x1, x2), and it is determined whether the to-be-translated word x3 belongs to the to-be-translated block 1. In this case, a block representation corresponding to the to-be-translated block 1 is B1=$H_{1,2}^w$=$\overrightarrow{H_2^w}$⊕$\overleftarrow{H_1^w}$. A result outputted by the partitioning model is p($a_3$)=ƒ($B_1$, $H_3^w$), and it is determined by using a function ƒ, whether a similarity between the to-be-translated word x3 and the to-be-translated block 1 is relatively high. If the similarity between the to-be-translated word x3 and the to-be-translated block 1 is relatively high, the to-be-translated word x3 belongs to the to-be-translated block 1, and the to-be-translated block 1 is updated into (x1, x2, x3), and it is determined whether the to-be-translated word x4 belongs to the to-be-translated block 1. The foregoing steps are sequentially repeated.

If the similarity between the to-be-translated word x2 and the to-be-translated block 1 is relatively low, the to-be-translated word x2 does not belong to the to-be-translated block 1, the to-be-translated block 1 is kept constant at (x1), and the to-be-translated word x2 is used as the to-be-translated block 2. In this case, the to-be-translated block 2 is (x2), and the next step is to determine whether the to-be-translated word x3 belongs to the to-be-translated block 2. The determining process is similar to the process of determining whether the to-be-translated word x2 belongs to the to-be-translated block 1, and details are not described herein again. The foregoing steps are sequentially repeated until all the to-be-translated words are determined.

S504: Translate the to-be-translated sentence according to the to-be-translated blocks.

It is assumed that the to-be-translated sentence includes k to-be-translated blocks. A block class hidden layer vector sequence (Y1, Y2, . . . , Yk) corresponding to the to-be-translated sentence is obtained based on the to-be-translated blocks, and Yk=(Bk, $C_{Bk}$) is a block representation and context information corresponding to each to-be-translated block in the to-be-translated sentence. The block representation of the to-be-translated block may be used for calculating a weight of an attention network and used for predicting a target word.

It is assumed that the to-be-translated sentence includes m to-be-translated sentences. A to-be-translated sentence i includes a to-be-translated block 1 to a to-be-translated block k, and a sentence representation corresponding to the to-be-translated sentence i is $H^B$=RNN(B1, ..., Bk). A sentence hidden layer vector sequence (Z1, Z2, ..., Zi, ..., Zm) corresponding to the to-be-translated sentence is obtained based on the sentence, and Zm=($H^B$, $C_{sm}$) is a sentence representation and context information corresponding to each sentence in the to-be-translated sentence. The sentence representation of the to-be-translated sentence may be used for calculating a weight of an attention network and used for predicting a class of a target word.

During decoding, according to the block class hidden layer vector sequence corresponding to the to-be-translated sentence, the decoder predicts a target word yk of the corresponding to-be-translated block k according to a context vector $C_{Bk}$ of the to-be-translated block k and a currently predicted target word {y1, y2, ..., yk−1}, to further generate a translation result of the to-be-translated sentence.

The present disclosure is described with reference to an application scenario below.

Figure 6:
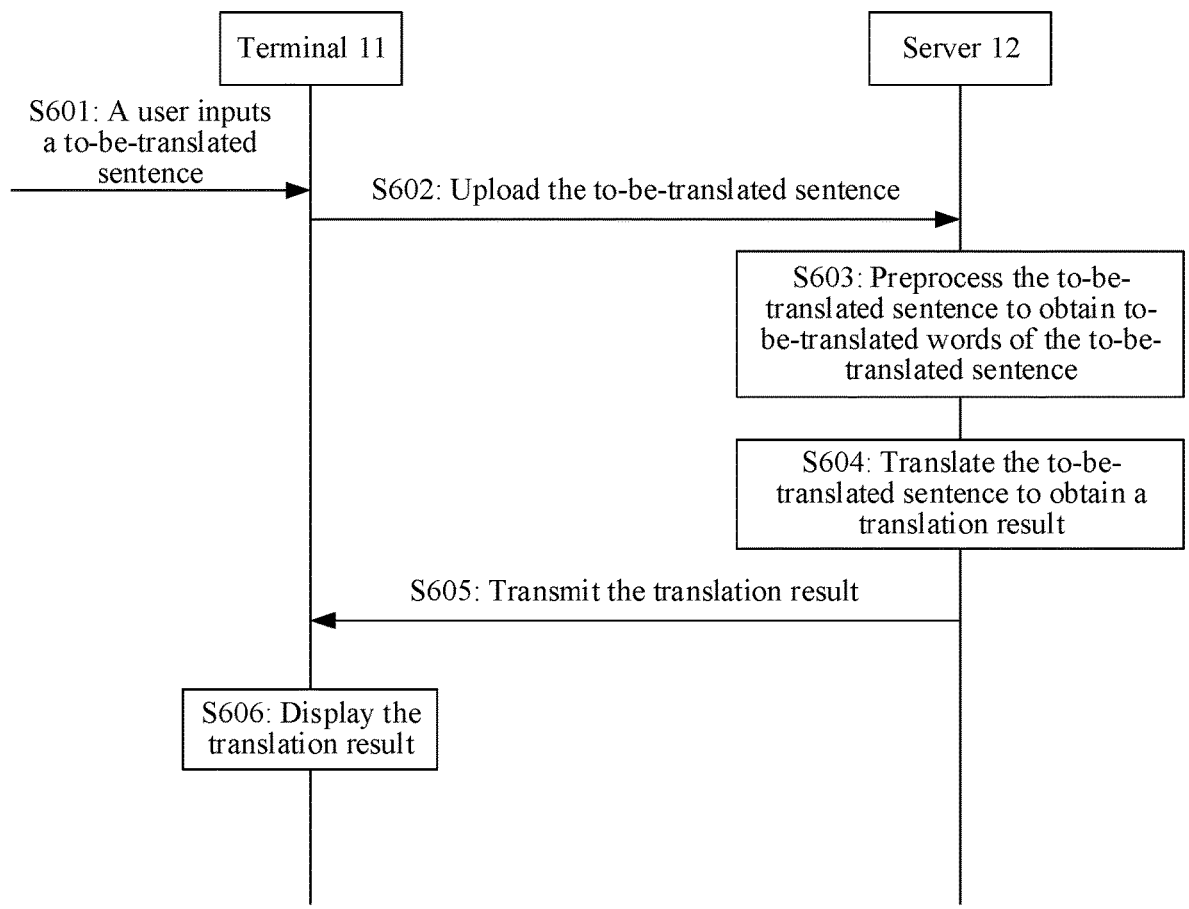
FIG. 6 is a fifth schematic flowchart of a machine translation method according to an embodiment of the present disclosure.

FIG. 6 is a fifth schematic flowchart of a machine translation method according to an embodiment of the present disclosure. Referring to FIG. 6, the machine translation method includes the following steps:

S601: A user inputs a to-be-translated sentence at a terminal 11.

Figure 15:
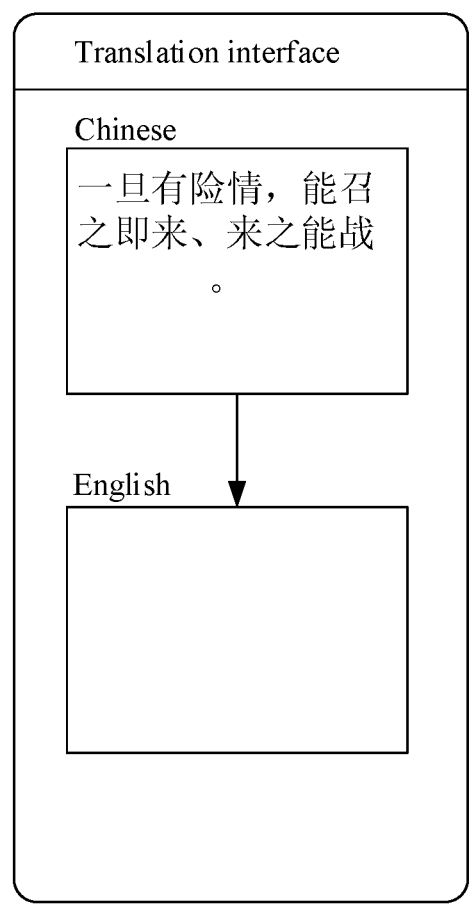

As shown in FIG. 15, the user inputs a to-be-translated sentence "一旦有险情 能召之即来 来之能战。" at an interface of a translation APP of the terminal.

S602: The terminal 11 uploads the to-be-translated sentence to a server 12.

S603: The server 12 preprocesses the to-be-translated sentence to obtain to-be-translated words of the to-be-translated sentence.

A to-be-translated sentence "一旦有险情 能召之即来 来之能战。" preprocessed to obtain a preprocessed text. Word segmentation is performed on the preprocessed text to obtain to-be-translated words "一旦", "有", "险情", "，", "能召之即来", "、", "来之能战", and "。" corresponding to the to-be-translated sentence.

S604: The server 12 translates the to-be-translated sentence to obtain a translation result.

If the server 12 divides the to-be-translated sentence "一旦有险情，能召之即来、来之能战。" only by using punctuation marks, three clauses of "一旦有险情，", "能召之即来、", and "来之能战。" are obtained. The translation is performed based on the clauses to obtain a translation result shown in FIG. 16. As shown in FIG. 16, the translation result corresponding to the to-be-translated sentence "一旦有险情，能召之即来、来之能战。" is "Once there is a danger, can call, can fight.", which obviously does not satisfy the user's expectations.

Correspondingly, in this step, according to the machine translation method provided in the present disclosure, all word representations of the to-be-translated words such as "一旦", "有", "险情", "，", "能召之即来", "、", "来之能战", and "。" may be obtained based on the bidirectional RNN. The trained partitioning model then partitions the to-be-translated sentence "一旦有险情，能召之即来、来之能战。" according to the word representations corresponding to the to-be-translated words and by using the trained partitioning model, to obtain to-be-translated blocks "一旦", "有险情", "，", "能召之即来、来之能战", and "。".

The translation is then performed on the to-be-translated sentence based on the to-be-translated blocks to obtain a translation result shown in FIG. 17. As shown in FIG. 17, the translation result corresponding to the to-be-translated sentence "一旦有险情，能召之即来、来之能战。" is "Once an emergency occurs, people can come and fight immediately.", which better satisfies the user's expectations.

S605: The server 12 transmits the translation result to the terminal 11.

S606: The terminal 11 displays the translation result on a translation interface.

Figure 18:
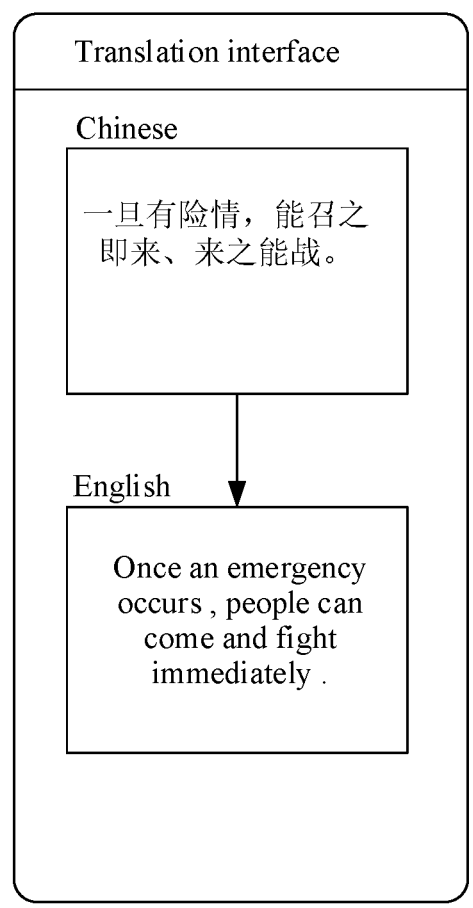

As shown in FIG. 18, the terminal 11 displays the translation result by using the translation interface.

It is to be understood that, although the steps are displayed sequentially according to the instructions of the arrows in the flowcharts of the embodiments, these steps are not necessarily performed sequentially according to the sequence instructed by the arrows. Unless clearly specified in this specification, there is no strict sequence limitation on the execution of the steps, and the steps may be performed in another sequence. In addition, at least some steps in the flowcharts may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 7:
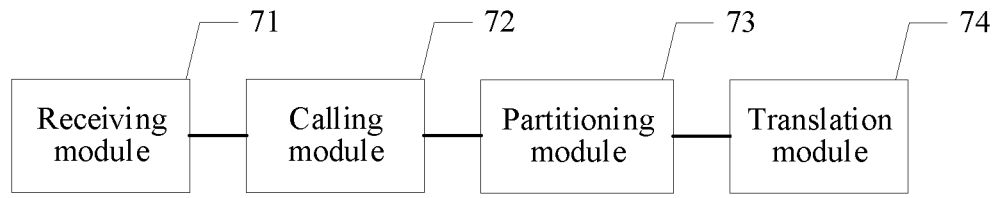
FIG. 7 is a first schematic structural diagram of a machine translation apparatus according to an embodiment of the present disclosure.

FIG. 7 is a schematic structural diagram of a machine translation apparatus according to an embodiment of the present disclosure. The machine translation apparatus includes a receiving module 71, a calling module 72, a partitioning module 73, and a translation module 74. All or some of the modules included in the machine translation apparatus may be implemented by software, hardware, or a combination thereof.

The receiving module 71 is configured to receive a to-be-translated sentence, the to-be-translated sentence including to-be-translated words.

The calling module 72 is configured to call a machine translation model obtained through training, the machine translation model including a partitioning model and a translation model.

The partitioning module 73 is configured to partition the to-be-translated sentence based on the partitioning model and according to word vectors of the to-be-translated words to obtain to-be-translated blocks, the to-be-translated block including at least one to-be-translated word.

The translation module 74 is configured to translate the to-be-translated sentence based on the translation model and the to-be-translated blocks to obtain a translation result.

In an embodiment, the receiving module 71 is further configured to: preprocess the to-be-translated sentence to obtain a preprocessed text; and perform word segmentation on the preprocessed text to obtain to-be-translated words corresponding to the to-be-translated sentence.

In an embodiment, the receiving module 71 is further configured to: obtain association relationships between the to-be-translated words; and combine to-be-translated words having an association relationship into one to-be-translated word.

In an embodiment, the partitioning module 73 is further configured to: obtain a word representation of a current to-be-translated word and a block representation of a current to-be-translated block according to the word vectors of the to-be-translated words; obtain an attribution relationship between the current to-be-translated word and the current to-be-translated block based on the partitioning model and according to the word representation of the current to-betranslated word and the block representation of the current to-be-translated block; and partition the to-be-translated sentence based on the partitioning model and the attribution relationship to obtain the to-be-translated blocks.

Figure 8:
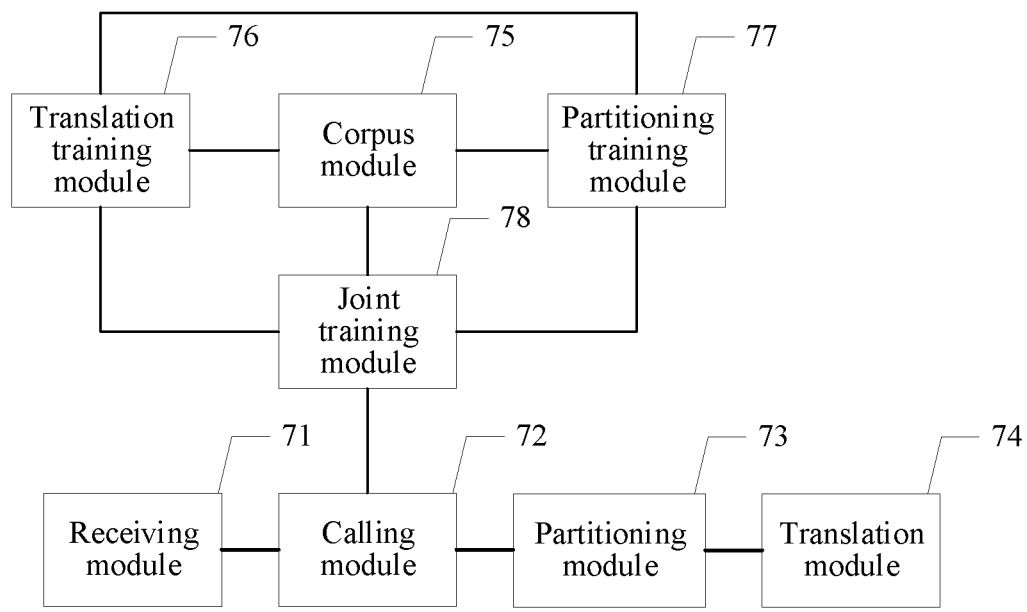
FIG. 8 is a second schematic structural diagram of a machine translation apparatus according to an embodiment of the present disclosure.

FIG. 8 is a schematic structural diagram of a machine translation apparatus according to another embodiment of the present disclosure. Referring to FIG. 8, the machine translation apparatus further includes the following modules:

a corpus module 75, configured to select a training corpus from a parallel sentence library, the parallel sentence library including a parallel sentence pair, the parallel sentence pair including a source sentence and a target sentence;

a translation training module 76, configured to train an initial translation model by using the training corpus to obtain a trained translation model;

a partitioning training module 77, configured to train an initial partitioning model by using the training corpus and based on the trained translation model to obtain a trained partitioning model; and a joint training module 78, configured to perform joint training on the trained translation model and the trained partitioning model by using the training corpus to obtain the machine translation model.

In an embodiment, the partitioning training module 77 may be configured to partition a source sentence in the training corpus based on the initial partitioning model to obtain blocks of the source sentence; translate the source sentence based on the blocks of the source sentence and the trained translation model to obtain a translated sentence corresponding to the source sentence; obtain a partitioning expected value of the initial partitioning model according to the translated sentence corresponding to the source sentence and a target sentence; and train the initial partitioning model according to an optimal principle of the partitioning expected value to obtain the trained partitioning model.

In an embodiment, the corpus module 75 is further configured to perform word alignment on the parallel sentence pair in the training corpus by using a word alignment tool; determine candidate partitioning positions according to an alignment result; and partition the source sentence in the training corpus based on the initial partitioning model and the candidate partitioning positions to obtain the blocks of the source sentence.

In an embodiment, the partitioning training module 77 may be configured to: obtain a likelihood parameter of the translated sentence corresponding to the source sentence and the target sentence; and obtain the partitioning expected value of the initial partitioning model according to the likelihood parameter.

In an embodiment, the partitioning training module 77 may be configured to: obtain a block quantity of the source sentence and a word quantity of the source sentence; obtain a penalty parameter according to the block quantity and the word quantity; and obtain the partitioning expected value of the initial partitioning model according to the likelihood parameter and the penalty parameter.

In an embodiment, the partitioning training module 77 may be configured to obtain a block representation of a current block and a word representation of a current word that are in the source sentence; obtain a similarity between the current word and the current block based on the similarity function; determine an attribution relationship between the current word and the current block according to the similarity; and partition the source sentence according to the attribution relationship to obtain the blocks of the source sentence.

In an embodiment, the joint training module 78 may be configured to obtain a translation expected value of the translation model and a partitioning expected value of the partitioning model; obtain a model expected value according to the translation expected value and the partitioning expected value; and perform joint training on the trained translation model and the trained partitioning model according to an optimal principle of the model expected value to obtain the machine translation model.

In an embodiment, an electronic device provided in an embodiment of the present disclosure includes a terminal, a server, and the like, which are separately described now.

Figure 9:
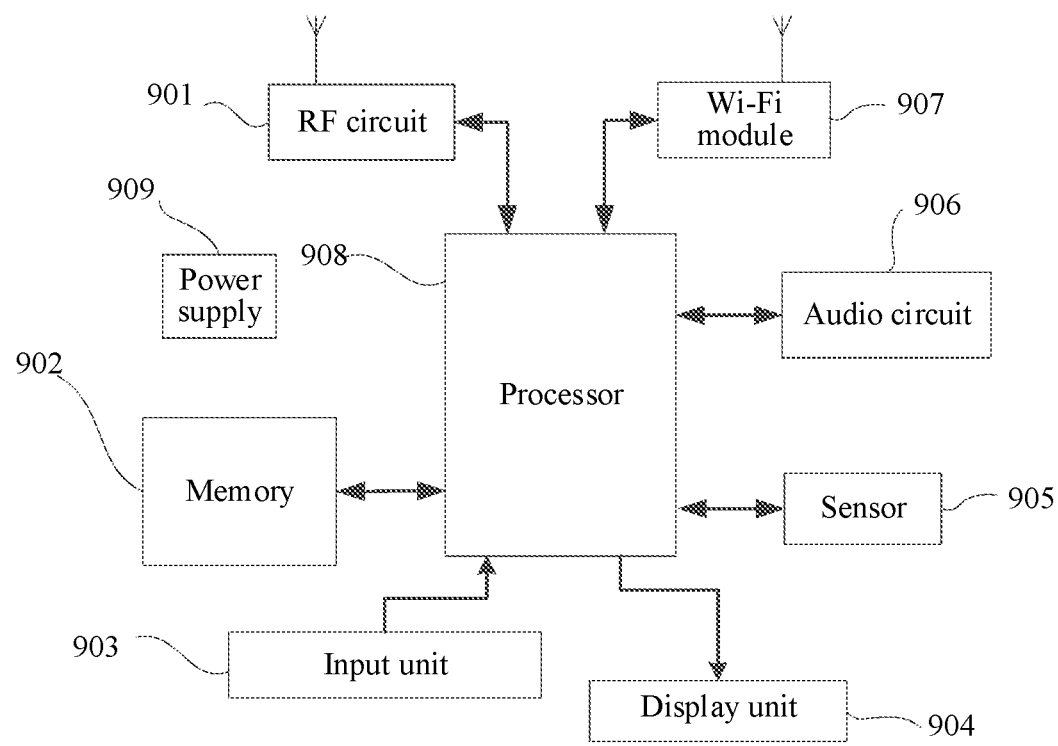
FIG. 9 is a schematic structural diagram of a terminal according to an embodiment of the present disclosure.

Correspondingly, an embodiment of the present disclosure further provides a terminal. As shown in FIG. 9, the terminal may include components such as a radio frequency (RF) circuit 901, a memory 902 including one or more computer-readable storage media, an input unit 903, a display unit 904, a sensor 905, an audio circuit 906, a Wireless Fidelity (Wi-Fi) module 907, a processor 908 including one or more processing cores, and a power supply 909. A person skilled in the art may understand that the terminal structure shown in FIG. 9 does not constitute a limitation on the terminal, and may include more or fewer components than shown, or combine some components, or have different component arrangements.

The RF circuit 901 may be configured to receive and transmit a signal during the transmitting and receiving of information or during a call. In particular, downlink information of a base station is processed by one or more processors 908 after being received. In addition, uplink data is sent to the base station. Generally, the RF circuit 901 includes but is not limited to, an antenna, at least one amplifier, a tuner, one or more oscillators, a subscriber identity module (SIM) card, a transceiver, a coupler, a low noise amplifier (LNA), duplexer, and the like. In addition, the RF circuit 901 may also communicate with a network and another device through wireless communication. The wireless communication may use any communication standard or protocol, including but not limited to, the Global System of Mobile Communication (GSM), general packet radio service (GPRS), and Code Division Multiple Access (CDMA), Wideband Code Division Multiple Access (WCDMA), Long Term Evolution (LTE), email, short messaging service (SMS), and the like.

The memory 902 may be configured to store the software programs and modules. The processor 908 runs the software programs and modules stored in the memory 902, to perform various function application and data processing. The memory 902 may mainly include a program storage area and a data storage area. The program storage area may store an operating system, an application program required by at least one function (for example, a sound playback function and an image playback function), or the like. The data storage area may store data (for example, audio data and a phone book) created according to use of the terminal. In addition, the memory 902 may include a high-speed random access memory, and may further include a non-volatile memory, such as at least one magnetic disk storage device, a flash memory, or another volatile solid-state storage device. Correspondingly, the memory 902 may further include a memory controller, so as to provide access of the processor 908 and the input unit 903 to the memory 902.

The input unit 903 may be configured to receive input digit or character information, and generate a keyboard, mouse, joystick, optical, or track ball signal input related to a user setting and function control. Specifically, in a specific embodiment, the input unit 903 may include a touch-sensitive surface and other input devices. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. In an embodiment, the touch-sensitive surface may include a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 908, and receives and executes a command transmitted by the processor 908. In addition, a variety of types such as resistive, capacitive, infrared, and surface acoustic waves may be used for implementing the touch-sensitive surface. Except the touch-sensitive surface, the input unit 903 may further include other input devices. Specifically, the another input device may include but is not limited to, one or more of a physical keyboard, a function key (for example, a volume control key or a power on/off key), a trackball, a mouse, or a joystick.

The display unit 904 may be configured to display information input by the user or provided to the user, and various graphical user interfaces of the terminal. These graphical user interfaces may be composed of graphics, text, icons, videos, and any combination thereof. The display unit 904 may include a display panel, and in an embodiment, the display panel may be configured in a form of a liquid crystal display (LCD), an organic light-emitting diode (OLED), or the like. Further, the touch-sensitive surface may cover the display panel. After the touch-sensitive surface detects a touch operation on the touch-sensitive surface or near the touch-sensitive surface, the touch operation is transmitted to the processor 908 to determine a type of a touch event, and then the processor 908 provides corresponding visual output on the display panel according to the type of the touch event. Although in FIG. 9, the touch-sensitive surface and the display panel are used as two independent components to implement the input and input functions, but in some embodiments, the touch-sensitive surface and the display panel may be integrated to implement the input and output functions.

The terminal may further include at least one sensor 905, such as an optical sensor, a motion sensor, and other sensors. Specifically, the optical sensor may include an ambient light sensor and a proximity sensor, where the ambient light sensor may adjust luminance of the display panel according to the luminance of the ambient light, and the proximity sensor may switch off the display panel and/or backlight when the terminal is moved to the ear. As one type of the motion sensor, a gravity acceleration sensor may detect a value of acceleration at each direction (which is generally triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal, is not described herein again.

The audio circuit 906 includes a speaker and a microphone, and may provide an audio interface between the user and the terminal. The audio circuit 906 may transmit, to the speaker, an electrical signal obtained through conversion of the received audio data, and the speaker converts the electrical signal into a sound signal to be output. According to another aspect, the microphone converts the collected sound signal into an electrical signal, the electrical signal is converted into audio data after being received by the audio circuit 906, and the audio data is sent to another terminal via the RF circuit 901 after being output to the processor 908 for processing, or the audio data is output to the memory 902 for further processing. The audio circuit 906 may further include an earplug jack to provide communication between a peripheral headset and the terminal.

Wi-Fi belongs to a short distance wireless transmission technology. The terminal may help, by using the Wi-Fi module 907, a user to send and receive an email, browse a web page, access stream media, and the like. This provides wireless broadband Internet access for the user. Although FIG. 9 shows the Wi-Fi module 907, it may be understood that the Wi-Fi module is not a necessary component of the terminal, and when required, the Wi-Fi module may be omitted as long as the scope of the essence of the present disclosure is not changed.

The processor 908 is the control center of the terminal, and is connected to various parts of the mobile phone by using various interfaces and lines. By running or executing the software program and/or module stored in the memory 902, and invoking data stored in the memory 902, the processor performs various functions and data processing of the terminal, thereby performing overall monitoring on the mobile phone. In an embodiment, the processor 908 may include one or more processing cores. Preferably, the processor 908 may integrate an application processor and a modem processor. The application processor mainly processes an operating system, a user interface, an application program, and the like. The modem processor mainly processes wireless communication. It may be understood that the foregoing modem processor may not be integrated into the processor 908.

The terminal further includes the power supply 909 (such as a battery) for supplying power to the components. Preferably, the power supply may be logically connected to the processor 908 by using a power management system, thereby implementing functions such as charging, discharging, and power consumption management by using the power management system. The power supply 909 may further include one or more of a direct current or alternating current power supply, a re-charging system, a power failure detection circuit, a power supply converter or inverter, a power supply state indicator, and any other component.

Although not shown in the figure, the terminal may further include a camera, a Bluetooth module, and the like. An embodiment of the present disclosure further provides a server. As shown in FIG. 10, FIG. 10 is a schematic structural diagram of the server used in the embodiments of the present disclosure. Specifically:

the server may include components such as a processor 1001 including one or more processing cores, a memory 1002 including one or more computer-readable storage mediums, a power supply 1003, and an input unit 1004. A person skilled in the art may understand that the server structure shown in FIG. 10 does not constitute a limit to the server. The server may include more or fewer parts than those shown in the figure, may combine some parts, or may have different part arrangements.

The processor 1001 is a control center of the server, and is connected to various parts of the entire server by using various interfaces and lines. By running or executing a software program and/or module stored in the memory 1002, and invoking data stored in the memory 1002, the processor executes various functions of the server and performs data processing, thereby monitoring the entire server. Optionally, the processor 1001 may include one or more processing cores. Preferably, the processor 1001 may integrate an application processor and a modem processor. The application processor mainly processes an operating system, a user interface, an application program, and the like. The modem processor mainly processes wireless communication. It may be understood that the foregoing modem may alternatively not be integrated into the processor 1001.

The memory 1002 may be configured to store a software program and a module, and the processor 1001 runs the software program and the module that are stored in the memory 1002, to implement various functional application and data processing. The memory 1002 may mainly include a program storage area and a data storage area. The program storage area may store an operating system, an application program required by at least one function (for example, a sound playback function and an image playback function), or the like. The data storage area may store data created according to use of the server. In addition, the memory 1002 may include a high-speed random access memory, and may further include a nonvolatile memory, such as at least one magnetic disk storage device, a flash memory, or another volatile solid-state storage device. Correspondingly, the memory 1002 may further include a memory controller, so that the processor 1001 may access the memory 1002.

The server further includes the power supply 1003 for supplying power to the components. Preferably, the power supply 1003 may be logically connected to the processor 1001 by using a power management system, thereby implementing functions such as charging, discharging, and power consumption management by using the power management system. The power supply 1003 may further include one or more of a direct current or alternating current power supply, a re-charging system, a power failure detection circuit, a power supply converter or inverter, a power supply state indicator, and any other components.

The server may further include an input unit 1004. The input unit 1004 may be configured to receive inputted digit or character information, and generate a keyboard, mouse, joystick, optical or track ball signal input related to the user setting and function control.

Although not shown in the figure, the server may further include a display unit. The electronic device provided in the foregoing embodiment includes a memory and a processor, the memory storing computer-readable instructions, the computer-readable instructions, when executed by the processor, causing the processor to perform the steps of the machine translation method. Herein, the steps of the machine translation method may be the steps of the machine translation method in the foregoing embodiments.

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

In view of this, an embodiment of the present disclosure further provides a computer-readable storage medium, storing computer-readable instructions, and the computer-readable instructions, when being executed by a processor, causing the processor to perform the steps in the foregoing machine translation method. Herein, the steps of the machine translation method may be the steps of the machine translation method in the foregoing embodiments. A person of ordinary skill in the art may understand that all or some procedures in the methods in the foregoing embodiments may be implemented by a computer-readable instruction instructing relevant hardware. The program may be stored in a non-volatile computer-readable storage medium. When the program is executed, the procedures of the foregoing method embodiments may be implemented. References to the memory, the storage, the database, or other medium used in the embodiments provided in the present disclosure may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

The foregoing embodiments only describe several implementations of the present disclosure specifically and in detail, but cannot be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the patent of the present disclosure shall be subject to the appended claims.

What is claimed is:

1. A machine translation method, performed by an electronic device, the method comprising:
    receiving a sentence, the sentence comprising a plurality of words;
    calling a machine translation model obtained through training, the machine translation model comprising a partitioning model and a translation model and being obtained by:
        selecting a training corpus from a parallel sentence library, the parallel sentence library comprising parallel sentence pairs, each parallel sentence pair comprising a source sentence and a target sentence;
        training an initial translation model by using the training corpus to obtain a trained translation model;
        training an initial partitioning model by using the training corpus and based on the trained translation model to obtain a trained partitioning model;
        obtaining a translation expected value of the trained translation model and a partitioning expected value of the trained partitioning model;

obtaining an overall model expected value of the machine translation model according to the translation expected value and the partitioning expected value; and performing joint training on the trained translation model and the trained partitioning model according to an optimal principle of the overall model expected value to obtain the machine translation model;

partitioning the sentence based on the partitioning model and according to word vectors of the words to obtain to-be-translated blocks, each to-be-translated block comprising at least one of the words; and translating the sentence based on the translation model and the to-be-translated blocks to obtain a translation result.

2. The machine translation method according to claim 1, wherein after receiving the sentence, the method further comprises:

preprocessing the sentence to obtain a preprocessed text; and performing word segmentation on the preprocessed text to obtain the words corresponding to the sentence.

3. The machine translation method according to claim 2, wherein partitioning the sentence based on the partitioning model and according to the word vectors of the words to obtain the to-be-translated blocks comprises:

obtaining a word representation of a current word and a block representation of a current to-be-translated block according to the word vectors of the words;

obtaining an attribution relationship between the current word and the current to-be-translated block based on the partitioning model and according to the word representation of the current word and the block representation of the current to-be-translated block; and partitioning the sentence based on the partitioning model and the attribution relationship to obtain the to-be-translated blocks.

4. The machine translation method according to claim 2, wherein after performing the word segmentation on the preprocessed text to obtain the words corresponding to the sentence, the method further comprises:

obtaining association relationships between the words; and combining words having an association relationship into one word.

5. The machine translation method according to claim 1, wherein training the initial partitioning model by using the training corpus and based on the trained translation model to obtain the trained partitioning model comprises:

partitioning a source sentence in the training corpus based on the initial partitioning model to obtain blocks of the source sentence;

translating the source sentence based on the blocks of the source sentence and the trained translation model to obtain a translated sentence corresponding to the source sentence;

obtaining a partitioning expected value of the initial partitioning model according to the translated sentence corresponding to the source sentence and the target sentence; and training the initial partitioning model according to an optimal principle of the partitioning expected value to obtain the trained partitioning model.

6. The machine translation method according to claim 5, wherein before partitioning the source sentence in the training corpus based on the initial partitioning model to obtain the blocks of the source sentence, the method further comprises:

performing word alignment on the parallel sentence pair in the training corpus;

determining candidate partitioning positions according to an alignment result obtained after the word alignment; and partitioning the source sentence in the training corpus based on the initial partitioning model and the candidate partitioning positions to obtain the blocks of the source sentence.

7. The machine translation method according to claim 5, wherein obtaining the partitioning expected value of the initial partitioning model according to the translated sentence corresponding to the source sentence and the target sentence comprises:

obtaining a likelihood parameter of the translated sentence corresponding to the source sentence and the target sentence; and obtaining the partitioning expected value of the initial partitioning model according to the likelihood parameter.

8. The machine translation method according to claim 5, wherein obtaining the partitioning expected value of the initial partitioning model according to the translated sentence corresponding to the source sentence and a target sentence further comprises:

obtaining a block quantity of the source sentence and a word quantity of the source sentence;

obtaining a penalty parameter according to the block quantity and the word quantity; and obtaining the partitioning expected value of the initial partitioning model according to the likelihood parameter and the penalty parameter.

9. The machine translation method according to claim 5, wherein the partitioning model comprises a similarity function; and partitioning the source sentence in the training corpus based on the initial partitioning model to obtain the blocks of the source sentence comprises:

obtaining a block representation of a current block and a word representation of a current word that are in the source sentence;

obtaining a similarity between the current word and the current block based on the similarity function;

determining an attribution relationship between the current word and the current block according to the similarity; and partitioning the source sentence according to the attribution relationship to obtain the blocks of the source sentence.

10. An electronic device, comprising a memory and a processor, the memory storing computer-readable instructions, the computer-readable instructions, when executed by the processor, causing the processor to perform a plurality of operations comprising:

receiving a sentence, the sentence comprising a plurality of words;

calling a machine translation model obtained through training, the machine translation model comprising a partitioning model and a translation model and being obtained by:

selecting a training corpus from a parallel sentence library, the parallel sentence library comprising parallel sentence pairs, each parallel sentence pair comprising a source sentence and a target sentence;

training an initial translation model by using the training corpus to obtain a trained translation model;

training an initial partitioning model by using the training corpus and based on the trained translation model to obtain a trained partitioning model;

obtaining a translation expected value of the trained translation model and a partitioning expected value of the trained partitioning model;

obtaining an overall model expected value of the machine translation model according to the translation expected value and the partitioning expected value; and performing joint training on the trained translation model and the trained partitioning model according to an optimal principle of the overall model expected value to obtain the machine translation model;

partitioning the sentence based on the partitioning model and according to word vectors of the words to obtain to-be-translated blocks, each to-be-translated block comprising at least one of the words; and translating the sentence based on the translation model and the to-be-translated blocks to obtain a translation result.

11. The device according to claim 10, wherein after receiving the sentence, the plurality of operations further comprises:

preprocessing the sentence to obtain a preprocessed text; and performing word segmentation on the preprocessed text to obtain the words corresponding to the sentence.

12. The device according to claim 11, wherein partitioning the sentence based on the partitioning model and according to the word vectors of the words to obtain the to-be-translated blocks comprises:

obtaining a word representation of a current word and a block representation of a current to-be-translated block according to the word vectors of the words;

obtaining an attribution relationship between the current word and the current to-be-translated block based on the partitioning model and according to the word representation of the current word and the block representation of the current to-be-translated block; and partitioning the sentence based on the partitioning model and the attribution relationship to obtain the to-be-translated blocks.

13. The device according to claim 11, wherein after performing the word segmentation on the preprocessed text to obtain the words corresponding to the sentence, the method further comprises:

obtaining association relationships between the words; and combining words having an association relationship into one word.

14. The device according to claim 10, wherein training the initial partitioning model by using the training corpus and based on the trained translation model to obtain the trained partitioning model comprises:

partitioning a source sentence in the training corpus based on the initial partitioning model to obtain blocks of the source sentence;

translating the source sentence based on the blocks of the source sentence and the trained translation model to obtain a translated sentence corresponding to the source sentence;

obtaining a partitioning expected value of the initial partitioning model according to the translated sentence corresponding to the source sentence and the target sentence; and training the initial partitioning model according to an optimal principle of the partitioning expected value to obtain the trained partitioning model.

15. The device according to claim 14, wherein before partitioning the source sentence in the training corpus based on the initial partitioning model to obtain the blocks of the source sentence, the plurality of operations further comprises:

performing word alignment on the parallel sentence pair in the training corpus;

determining candidate partitioning positions according to an alignment result obtained after the word alignment; and partitioning the source sentence in the training corpus based on the initial partitioning model and the candidate partitioning positions to obtain the blocks of the source sentence.

16. The device according to claim 14, wherein obtaining the partitioning expected value of the initial partitioning model according to the translated sentence corresponding to the source sentence and the target sentence comprises:

obtaining a likelihood parameter of the translated sentence corresponding to the source sentence and the target sentence; and obtaining the partitioning expected value of the initial partitioning model according to the likelihood parameter.

17. A non-transitory storage medium storing computer-readable instructions, the computer-readable instructions, when executed by one or more processors, causing the one or more processors to perform:

receiving a sentence, the sentence comprising a plurality of words;

calling a machine translation model obtained through training, the machine translation model comprising a partitioning model and a translation model and being obtained by:

selecting a training corpus from a parallel sentence library, the parallel sentence library comprising parallel sentence pairs, each parallel sentence pair comprising a source sentence and a target sentence;

training an initial translation model by using the training corpus to obtain a trained translation model;

training an initial partitioning model by using the training corpus and based on the trained translation model to obtain a trained partitioning model;

obtaining a translation expected value of the trained translation model and a partitioning expected value of the trained partitioning model;

obtaining an overall model expected value of the machine translation model according to the translation expected value and the partitioning expected value; and performing joint training on the trained translation model and the trained partitioning model according to an optimal principle of the overall model expected value to obtain the machine translation model;

partitioning the sentence based on the partitioning model and according to word vectors of the words to obtain to-be-translated blocks, each to-be-translated block comprising at least one of the words; and translating the sentence based on the translation model and the to-be-translated blocks to obtain a translation result.

\* \* \* \* \*